United States Patent
Sprung (10) Patent No.: US 8,479,685 B2
(45) Date of Patent: Jul. 9, 2013

(54) MAGNETICALLY COUPLED WALL ATTACHMENT DEVICE

(76) Inventor: Julian Sprung, Miami Beach, FL (US)

( * ) Notice: Subject to any disclaimer, the term of this patent is extended or adjusted under 35 U.S.C. 154(b) by 307 days.

(21) Appl. No.: 12/877,861

(22) Filed: Sep. 8, 2010

(65) Prior Publication Data

US 2011/0056437 A1    Mar. 10, 2011

Related U.S. Application Data

(60) Provisional application No. 61/272,283, filed on Sep. 8, 2009.

(51) Int. Cl.
*A01K 61/02* (2006.01)

(52) U.S. Cl.
USPC ....................................... 119/51.04

(58) Field of Classification Search
USPC .......................... 119/51.04, 51.01, 269, 230
See application file for complete search history.

(56) References Cited

U.S. PATENT DOCUMENTS

| | | | |
|---|---|---|---|
| 2,977,082 A * | 3/1961 | Harris ......................... | 248/206.5 |
| 3,208,090 A | 9/1965 | Roesel, Jr. | |
| 3,664,303 A * | 5/1972 | Baensch ..................... | 119/51.03 |
| 5,028,223 A * | 7/1991 | Ameter ........................... | 425/12 |
| 5,778,824 A | 7/1998 | Musgrave et al. | |
| 5,988,109 A * | 11/1999 | Rofen ............................ | 119/245 |
| 6,348,104 B1 | 2/2002 | Bakker | |
| 6,422,746 B1 | 7/2002 | Weiss et al. | |
| 6,634,052 B2 | 10/2003 | Hanson | |
| 6,865,771 B2 * | 3/2005 | Hanson ......................... | 15/220.2 |
| 6,988,290 B2 * | 1/2006 | Enoch et al. .................. | 15/103 |
| 7,232,519 B2 * | 6/2007 | Bluteau ..................... | 210/167.21 |
| 7,313,840 B2 * | 1/2008 | Watkins .......................... | 15/103 |
| 7,313,841 B2 * | 1/2008 | Huang ......................... | 15/220.2 |
| 7,699,277 B2 * | 4/2010 | Bagnall ...................... | 248/206.5 |
| 7,784,428 B2 * | 8/2010 | Deng ............................. | 119/264 |
| 7,943,091 B2 * | 5/2011 | Beck et al. ................. | 422/82.05 |
| 8,065,975 B2 * | 11/2011 | Allis ............................. | 119/264 |
| 8,161,909 B2 * | 4/2012 | Sprung ......................... | 119/264 |
| 8,191,846 B2 * | 6/2012 | Bresolin .................... | 248/309.4 |
| 2004/0018104 A1 * | 1/2004 | Watkins ..................... | 417/423.3 |
| 2007/0107665 A1 * | 5/2007 | Enoch et al. ................. | 119/264 |
| 2009/0211533 A1 | 8/2009 | Sprung | |
| 2010/0024739 A1 * | 2/2010 | Bakker ......................... | 119/264 |

* cited by examiner

*Primary Examiner* — Yvonne Abbott
(74) *Attorney, Agent, or Firm* — Venable LLP; Michael A. Gollin; Steven J. Schwarz (57) ABSTRACT

A magnetically coupled device for an aquarium wall. The device may include an inner member and an outer member. The inner member may include a main body portion and an inner magnetic or magnetically attractable element coupled to or disposed within the main body portion. The outer member may include an outer magnetic or magnetically attractable element and a polymer static cling layer. The outer magnetic or magnetically attractable element may be magnetically attracted to the inner magnetic or magnetically attractable element. The polymer static cling layer may be configured to allow the outer member to be removably attached to an outer surface of the aquarium wall. The inner member may be removably attached to an inner surface of the aquarium wall by magnetic attraction with the outer member. The device may provide, for example, a feeding point for aquatic life contained in the aquarium.

26 Claims, 6 Drawing Sheets

MAGNETICALLY COUPLED WALL ATTACHMENT DEVICE

CROSS-REFERENCE TO RELATED APPLICATIONS

This application claims the priority benefit under 35 U.S.C. §119(e) of U.S. Provisional Patent Application No. 61/272,283, filed on Sep. 8, 2009, the entirety of which is hereby expressly incorporated by reference.

BACKGROUND

1. Field of Invention

The invention is related to magnetically coupled wall attachment devices such as, for example, for removable attachment of useful aquarium devices to aquarium walls, as well as to springless magnetic clips for removable attachment to magnetic or magnetically attractable surfaces. More particularly, the invention is related to a magnetically coupled device, for example, for use in aquariums to provide an easily removable yet secure attachment point for aquarium devices such as feeding devices that retain different types of foods for fish and assists the feeding of fishes. The invention also relates to a springless magnetic clip device, for example, for use on refrigerator doors or other magnetic or magnetically attractable surfaces to hold various objects.

2. Related Art

Aquarists and like hobbyists that maintain fish tanks or aquariums for the purpose of nurturing and cultivating fish and other aquatic life must supply food to the aquarium in order to feed these aquatic animals. This can present several problems. For example, food that is simply dropped into the water may fall to the aquarium floor before the fish or other animals are able to consume the food. Such food may be lost in the rocks, plants or aquarium decorations or be pulled into the filtering system.

One known way to feed aquatic animals involves holding food, for example lettuce, in a spring-loaded plastic clip attached with a suction cup or magnet to an inner wall of the aquarium. This can provide the fish with a fixed location for food but requires the aquarist to put their hand or arm into the aquarium water in order to mount the suction cup against the aquarium walls and/or to retrieve the device from the bottom of the tank when the suction cup fails. Additionally, the torsion springs utilized in such plastic clips have a limited life due to flexing and eventually can snap. Furthermore, if the device is secured to the wall magnetically and becomes detached, both the outer and inner members fall from the wall and can be difficult to retrieve.

An effective and reliable device for removably attaching items to aquarium walls is needed including, for example, fixed point feeding devices for feeding fish within aquariums, tanks, pools or the like is needed. The device should be inexpensive to manufacture and relatively maintenance free over the life of the device. The device should easy to insert and remove from the aquarium, preferably without getting the aquarist's hands and arms wet. Furthermore, the device should be removably attachable to the aquarium wall as well as to other magnetic or magnetically attractable surfaces.

SUMMARY

The invention relates to magnetically coupled wall attachment devices such as, for example, for removable attachment to aquarium walls, and springless magnetic clips for removable attachment to magnetic or magnetically attractable surfaces. More particularly, the invention is related to a magnetically coupled device, for example, for use in aquariums to provide an easily removable yet secure attachment point for aquarium devices such as feeding devices that retain different types of foods for fish and assists the feeding of fishes. The device may be used in all types of aquariums such as, for example, freshwater and saltwater, including small or large aquariums, aquariums with curved windows, and fishbowls.

In an embodiment of the invention, a magnetically coupled device for an aquarium wall is provided. The device may include an inner member and an outer member. The inner member may include a main body portion and an inner magnetic or magnetically attractable element coupled to or disposed within the main body portion. The outer member may include an outer magnetic or magnetically attractable element and a polymer static cling layer. The outer magnetic or magnetically attractable element may be magnetically attracted to the inner magnetic or magnetically attractable element. The polymer static cling layer may be configured to allow the outer member to be removably attached to an outer surface of the aquarium wall and the inner member may be magnetically coupled to the aquarium wall by the outer member. The device may provide, for example, a feeding point for aquatic life contained in the aquarium.

In another embodiment of the invention, a springless magnetic clip is provided. The clip may include a main body portion; a gripper element coupled to or defined by the main body portion and having first and second arms; a first magnetic or magnetically attractable element disposed proximate an end of the first arm; and a second magnetic or magnetically attractable element disposed proximate an end of the second arm, and wherein the first and second magnetic or magnetically attractable elements are magnetically attracted to one another to bias the first and second arms toward one another to hold an object between the ends of the first and second arms.

In another embodiment of the invention, a magnetically coupled feeding device for an aquarium is provided. The feeding device may include a buoyant inner member and an outer member. The inner member may include a main body portion, an inner magnetic or magnetically attractable element disposed within the main body portion, and a food retention element coupled to or defined by the main body portion. The outer member may include an outer magnetic or magnetically attractable element. The outer magnetic or magnetically attractable element may be magnetically attracted to the inner magnetic or magnetically attractable element, whereby the buoyant inner member is removably attached to a wall of the aquarium by the outer member.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of some example embodiments of the invention, as illustrated in the accompanying drawings. Unless otherwise indicated, the accompanying drawing figures are not to scale. Several embodiments of the invention will be described with respect to the following drawings, in which like reference numerals represent like features throughout the figures, and in which.

DETAILED DESCRIPTION

Various embodiments of the invention are discussed in detail below. While specific embodiments are discussed, specific terminology is employed for the sake of clarity. However, the invention is not intended to be limited to the specific terminology so selected and it should be understood that this is done for illustration purposes only. A person skilled in the relevant art will recognize that other components and configurations can be used without parting from the spirit and scope of the invention. Each specific element includes all technical equivalents that operate in a similar manner to accomplish a similar purpose.

Figure 1:
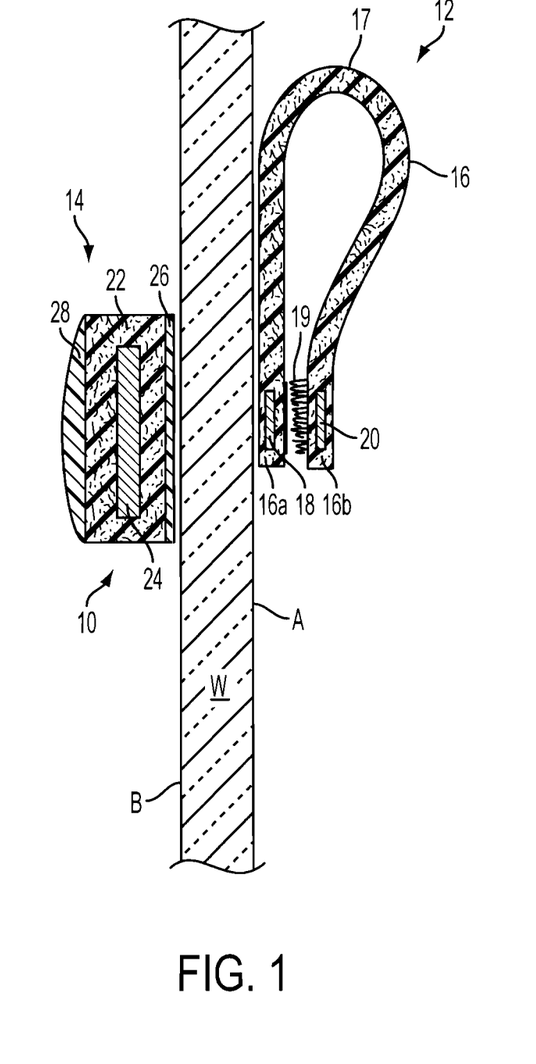
FIG. 1 schematically depicts a side cross-sectional view of a magnetically coupled feeding device including inner and outer members removably attached to respective inner and outer surfaces of an aquarium wall according to an embodiment of the invention.

FIG. 1 schematically depicts a side cross-sectional view of a magnetically coupled feeding device 10 including an inner member 12 and an outer member 14 removably attached to respective inner and outer surfaces A, B of an aquarium wall W according to an embodiment of the invention. The inner member 12 may include a main body 16 and at least one magnetic or magnetically attractable element 18, 20. The main body 16 may be, for example, a buoyant, flexible body defining, for example, a gripper or food retention element folded about bend 17 to form first and second arms 16a, 16b. The main body 16 may be formed from one or more strips of a buoyant, flexible material such as, for example, but not limited to, die-cut closed-cell foam pieces (e.g., cross-linked polyethylene foam, ethylene vinyl acetate (EVA) polymer, neoprene, and the like). A magnetic or magnetically attractable element 18 may be disposed within or coupled to an end of the first arm 16a. Another magnetic or magnetically attractable element 20 may be disposed within or coupled to an end of the second arm 16b. The magnetic elements 18, 20 may be magnetically attracted to one another such that the first and second arms 16a, 16b of the inner member 12 form a hinged clamp or clip configured to receive and hold food (not shown) for aquatic life. One of the magnetic elements 18, 20 may be formed of a magnetic material such as, for example, neodymium magnets or another type of magnet (e.g., ceramic). The other of the magnetic elements 18, 20 may be formed of a magnetic material such as, for example, neodymium magnets or another type of magnet (e.g., ceramic) or may be a magnetically attractable material such as, for example, a metal. The magnetic or magnetically attractable elements 18, 20 of the inner member 12 may be pre-coated with parylene or epoxy, or they may be imbedded in a potting epoxy compound during production of the device to provide additional corrosion resistance. A layer of adhesively-backed hook material 19 such as, for example, from Velcro® brand hook-and-loop material, may be disposed adjacent the end of at least one of the arms 16a, 16b, to provide a more abrasive surface to better hold or grip the food by increased friction.

The outer member 14 may include a main body 22. Another magnetic or magnetically attractable element 24 may be disposed within the main body 22 of the outer member 14 which magnetic member 24 may be magnetically attracted to one or more magnetic or magnetically attractable elements such as, for example, elements 18 and/or 20 or another such element (see, e.g., FIG. 3), disposed on or within the inner member 12. In this way, the inner member 12 may be magnetically coupled to the wall W of the aquarium by the outer member 14 to provide a feeding point for aquatic life. The main body 22 of the outer member 14 may be formed from, for example, but not limited to, die-cut closed-cell foam pieces (e.g., cross-linked polyethylene foam, ethylene vinyl acetate (EVA) polymer, polychloroprene (Neoprene®), and the like). The magnetic or magnetically attractable element 24 may be formed of a magnetic material such as, for example, neodymium magnets or another type of magnet (e.g., ceramic) or may be a magnetically attractable material such as, for example, a metal.

As shown in FIG. 1, the outer member 14 can include a polymer static cling adhesive layer 26 attached to one side of the main body 22 to allow it to remain attached to the glass (or acrylic) aquarium wall W even when the inner and outer elements 12, 14 become uncoupled. This may be accomplished with a layer of static cling adhesive material such as, for example, static cling vinyl, applied to a surface of the outer member 14 that rests against the aquarium wall W. Static cling vinyl is a particular formulation of polyvinyl chloride (PVC) to which a large amount of liquid plasticizer has been added. This highly plasticized formulation can be exceptionally pliable and may allow the outer member 14 to be applied and adhere to a clean, smooth, glossy surface without the need for an adhesive. Because there is no adhesive, application or installation is very easy and the outer member 14 can be removed and re-applied nearly indefinitely without leaving behind an adhesive residue. Moreover, since the main body 22 of the outer member 14 may also be composed of flexible foam, it is a simple matter for the aquarist to squeeze the outer member 14 lightly to release the static grip so that the outer member 14 can be repositioned on the outer surface of the aquarium wall W as desired. A "bubble" or "dome" label 28 of polyurethane material may be attached to a surface of the main body 22 opposite the static cling adhesive layer 26. The label 28 may be, for example, a dome label as manufactured by Cypress Multigraphics, LLC, Decal Minnesota division, Plymouth, Minn. The dome label 28 may include, for example, a brand name printed on a lower part and a clear, flexible polyurethane dome window disposed thereon. The clear dome material may adhere well to glass by static forces. The static cling layer 26 may also be such a "bubble" or "dome" label. For example, the construction of the outer member 14 may have, but is not necessarily limited to, the following layers: dome label 26, buoyant closed-cell foam material 22 (e.g., EVA) with magnetic or magnetically attractable element 24 disposed therein, dome label 28. Additionally, the main body 22 may include two or more foam layers glued together with the magnetic or magnetically attractable element 24 retained within a cavity therein. The adhesion of the foam pieces can also be accomplished through applied adhesives such as are commonly available in crack-and-peel form from 3M company of St. Paul, Minn., or the pieces may be manufactured from sheets of closed cell foam that already have the adhesive applied.

Figure 2:
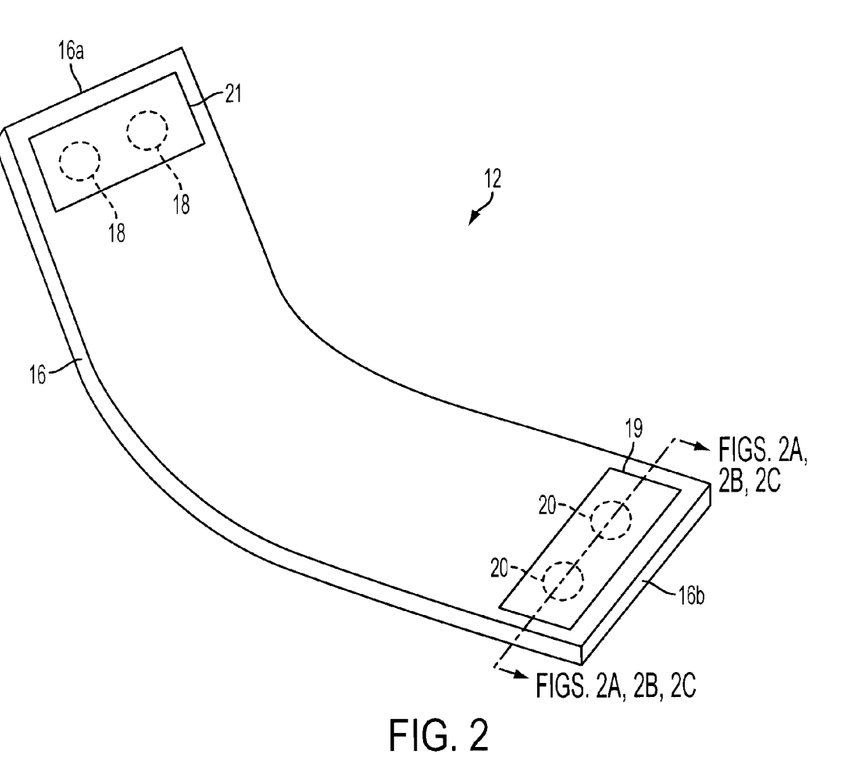
FIG. 2 depicts a schematic perspective view of the inner member of the magnetically coupled feeding device of FIG. 1 in an open configuration.
Figure 2A:
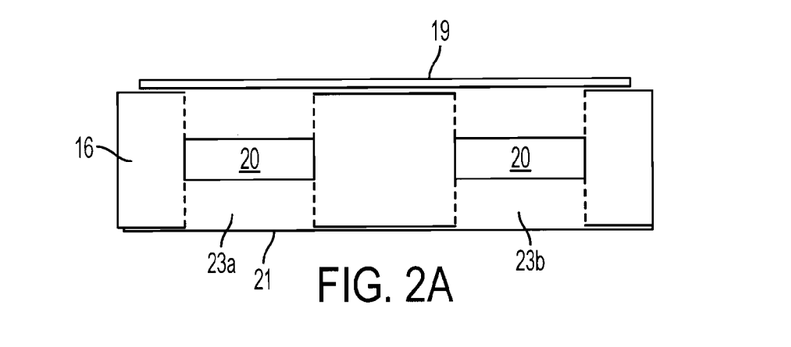
FIGS. 2A-2C schematically depict cross-sectional views of an end portion of the inner member of FIG. 2 according to various embodiments of the invention.
Figure 2B:
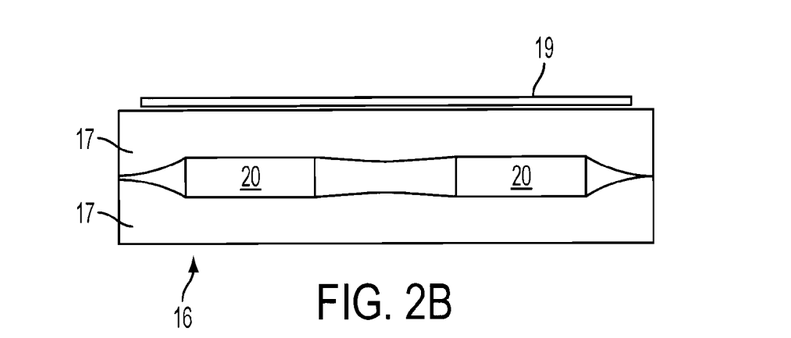
Figure 2C:
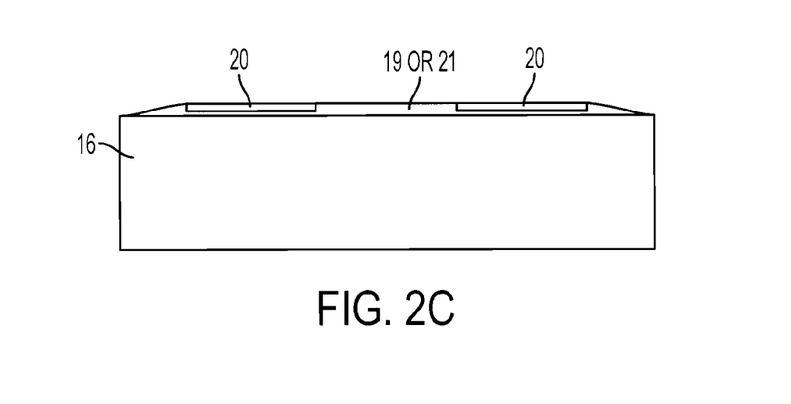

FIG. 2 depicts a schematic perspective view of the inner member 12 of the magnetically coupled feeding device 10 of FIG. 1 in an open configuration. As shown in FIG. 2, each arm 16a, 16b may have one or more magnetic or magnetically attractable elements 18, 20 as well as a layer of adhesively-backed hook material 19 or other plastic waterproof strip material 21. FIGS. 2A-2C schematically depict cross-sectional views of an end portion of the inner member of FIG. 2 according to various embodiments of the invention. FIG. 2A, for example, shows another embodiment in which the body 16 has two through holes 23a, 23b each having a magnetic or magnetically attractable element 20 received therein and sealed by layers 19 and 21. FIG. 2B, for example, shows an embodiment in which the body 16 comprises two layers 17 adhered to one another and between which the magnetic or magnetically attractable elements 20 are received. FIG. 2C shows yet another embodiment in which the magnetic or magnetically attractable elements 20 are secured on an outer surface of the body 16 and over which a layer of hook material 19 or plastic strip material 21 is provided.

The inner member 12 of the device 10 may be buoyant and may therefore eliminate the need to reach into the aquarium water to grab the inner member 12 to load the food. The inner member 12 may be easily placed at any height against the aquarium wall W. The device eliminates the need for suction cups that can lose efficacy. The inner member 12 may float and so cannot fall and get lost in the aquarium decorations. In designing the inner member 12 to be buoyant, a balance may be achieved considering the amount of buoyant material of the inner member 12, the weight of the magnetic or magnetically attractable elements 18, 20 of the inner member 12, and any other materials attached to the inner member 12, as well as the expected thickness of the aquarium wall W and magnetic strength or material type of the outer element 24.

Figure 3:
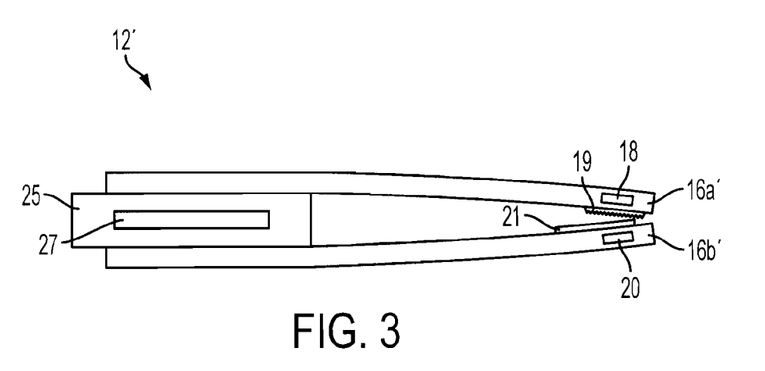
FIG. 3 schematically depicts a side cross-sectional view of an inner member of a magnetically coupled feeding device in a closed configuration according to another embodiment of the invention.

FIG. 3 schematically depicts a side cross-sectional view of an inner member 12' of a magnetically coupled feeding device 10' in a closed configuration according to another embodiment of the invention. The device 10' may be substantially similar to the device 10 shown in FIG. 1 except that the first and second arms 16a', 16b' of the inner member 12' may be separately connected to a main body 25. The main body 25 may have a magnetic or magnetically attractable element 27 disposed therein for magnetic coupling with an outer member 14 as described above and depicted in FIG. 1. The main body 25 may be composed of, for example, die-cut closed-cell foam (e.g., cross-linked polyethylene foam, ethylene vinyl acetate (EVA) polymer, polychloroprene (Neoprene®), and the like). As in the embodiment depicted in FIG. 1, each arm 16a', 16b' may have one or more magnetic or magnetically attractable elements 18, 20 as well as a layer of adhesively-backed hook material 19 or other plastic waterproof strip material 21. In an embodiment of the invention, the main body 25 of the inner member 12' could be, for example, a coating such as, for example, a thin layer of polymer, epoxy, silicone, or plastic material. The magnet or magnetically attractable element 27 could be covered or enclosed within the coating. For example, the magnetic or magnetically attractable element 27 could be set into main body 25 which may be a liquid cast material that is buoyant and flexible when it cures.

An example use of the feeding device 10 may be described as follows with reference to FIG. 1. The user opens the arms 16a, 16b of the inner member 12 against the magnetic force of attraction between the magnetic or magnetically attractable elements 18, 20 in the arms 16a, 16b, then inserts food (not shown) and allows the arms 16a, 16b to close by way of the magnetic forces. The user can then place the buoyant inner member 12 holding the food in the aquarium and can then position the outer member 14 near the inner member 12 to attract it towards a desired point on the aquarium wall W. The inner member 12 may readily "swim" toward its magnetic partner due to the magnetic attraction. The user may then position the outer member 14 at a desired point on the outer surface B of the aquarium wall W and thereby secure the inner member 12 to the inner surface A of the aquarium wall W to provide a designated feeding point for aquatic life in the aquarium. If for some reason the inner member 12 becomes uncoupled from the outer member 14, the outer member 14 may remain attached to the outer surface B of the aquarium wall W by way of the static cling vinyl layer 26 disposed thereon.

According to another embodiment, the above-described inner member 12 may also be used by itself, i.e., without the outer member 14, in other applications outside of an aquarium such as, for example, to hold other objects on a magnetic or magnetically attractable surface in the form of a springless magnetic clip. For example, the inner member 12 could be magnetically coupled to a metal refrigerator door or wall (e.g., a cubicle wall) (none of which are shown) to hold objects such as, for example, sheets of paper, notes, photos, or the like (not shown), between the ends of the first and second arms 16a, 16b. The first and second arms 16a, 16b of the springless magnetic clip 12 may be formed from, for example, but not limited to, a foam material, a polymer or copolymer, or any flexible plastic material. More specifically, the arms 16a, 16b may be formed from, for example, die-cut cross-linked polyethylene foam, an ethylene vinyl acetate (EVA) polymer, polychloroprene (Neoprene®), or silicone.

Figure 4:
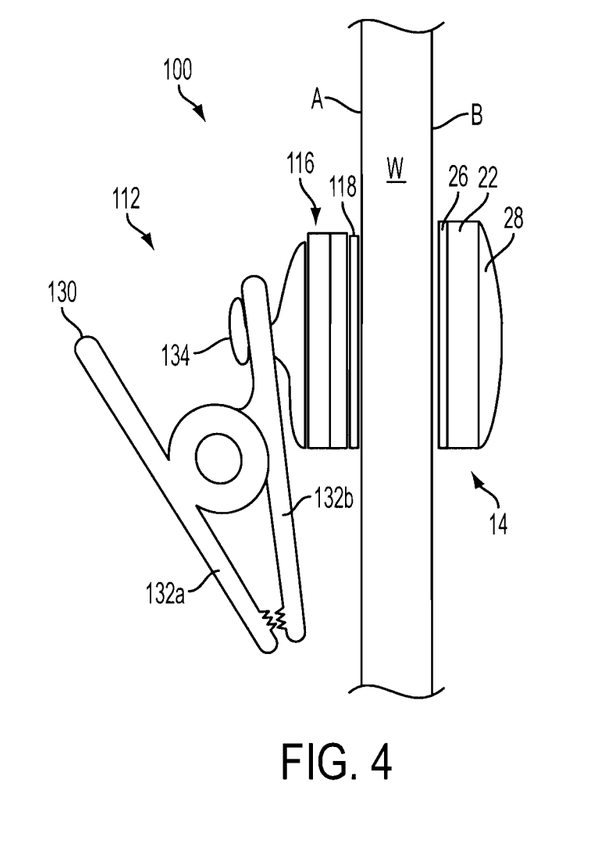
FIG. 4 depicts a side view of a magnetically coupled feeding device including inner and outer members removably attached to respective inner and outer surfaces of an aquarium wall according to another embodiment of the invention.

FIG. 4 depicts a side view of a magnetically coupled feeding device 100 including a buoyant inner member 112 and outer member 14 removably attached to respective inner and outer surfaces A, B of an aquarium wall W according to another embodiment of the invention. The inner and outer members 112, 14 may be constructed to be magnetically attracted to one another while disposed on opposite sides of wall W so as to removably couple the device 100 to the wall W while holding food for aquatic life contained in the aquarium. The inner member 112 depicted in FIG. 4 may include a food retention element such as, for example, a mechanical clip or gripper element 130 having claws or arms 132a, 132b spring-biased in a closed position to hold the food. The gripper element 130 may be attached to or formed integrally with a protruding attachment portion 134 configured to be coupled with a portion of the gripper element 130. A main body portion 116 of the buoyant inner member 112 may be formed from closed-cell foam or some other similar material. A magnetic or magnetically attractable element (not shown) such as, for example, a neodymium magnet or other magnetic material, may be disposed within the main body portion 116 of the buoyant inner member 112. The main body portion 116 of the inner member 112 may contact the wall W directly or, alternatively, a layer of adhesively-backed plastic material 118 may be attached thereto and configured to contact the wall W. The adhesively-backed plastic material 118 may include product label information or may even include a felt layer or either one of the respective layers of a hook-and-loop fastener material. The outer member 14 shown in FIG. 4 may be similar in construction to the outer member 14 described above with reference to FIG. 1.

Figure 5:
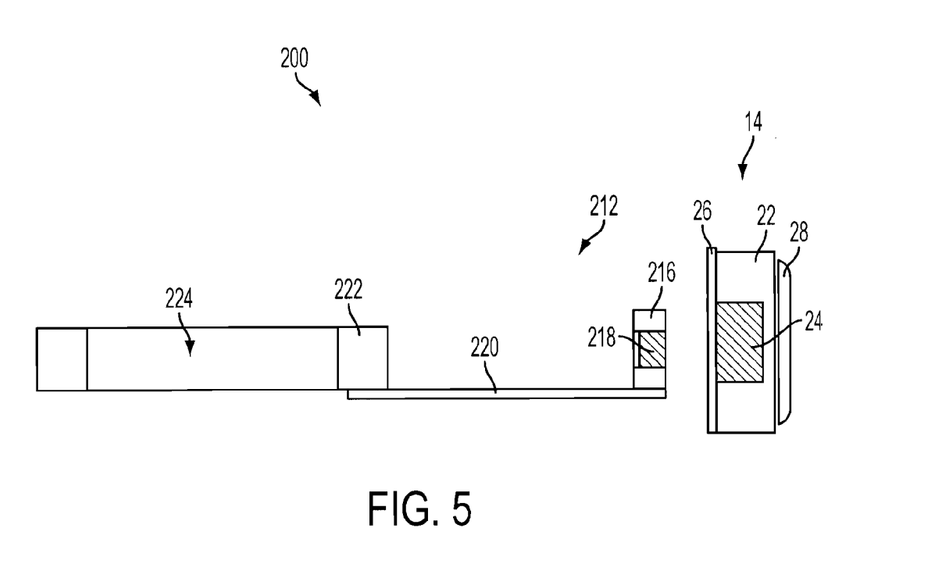
FIG. 5 depicts an illustrative and schematic side view of a feeding device including an inner member magnetically attracted to an outer member according to another embodiment of the invention.

FIG. 5 depicts an illustrative and schematic side view of a floating feeding point device 200 including an inner member 212 magnetically attracted to an outer member 14 according to another embodiment of the invention. Outer member 14 shown in FIG. 5 may be similar in construction to the outer member 14 described above with reference to FIGS. 1 and 4. That is, the outer member 14 may include a layer of static cling material 26 on the surface configured to contact the outer wall surface of the aquarium to allow it to remain attached to the outer surface of the aquarium wall even when magnetically uncoupled from the magnetic or magnetically attractable element 218 of the inner member 212. Inner member 212 may include a main body 216, an extended hinge portion 220, and a food retention element such as, for example, ring portion 222. The main body 216 may have a magnetic or magnetically attractable element 218 disposed therein for magnetic coupling to the outer member 14 through an aquarium wall. One or all of the main body 216, extended hinge portion 220, and ring portion 222 may be formed of a buoyant material such as, for example, die-cut closed-cell foam (e.g., cross-linked polyethylene foam, ethylene vinyl acetate (EVA) polymer, polychloroprene (Neoprene®), and the like). The die-cut pieces may be glued where needed to form hinges. The magnetic or magnetically attractable element 218 in the inner member 212 may be, for example, a neodymium magnet or another magnetic material (e.g., ceramic) or a metal coated in, for example, epoxy to prevent corrosion.

When magnetically coupled to an aquarium wall near the surface of the water, the device 200 may define a feeding point. The ring portion 222 may retain food pellets or flakes added inside the ring at 224. Using the feeding device 200, an aquarist can put dry food into the center 224 so that it floats at or sinks from that particular position. In the absence of such a feeding point, the food may float on the surface and drift all over the tank, or worse, get drawn into the drain that sends water to the filter. In addition, with a feeding point in place the fish quickly learn where the food can be found (i.e., at or below the feeding point).

The feeding ring portion 222, which may be, for example, but not limited to, a square or circular or other shaped ring that floats in a fixed position on the water surface, does not require a mechanical hinge as the flexibility of a thin sheet of closed cell foam 220 may provide the required movement that duplicates a hinge. A hinge movement is needed for the feeding ring portion 222 to allow it to remain flat on the surface of the water in the aquarium over a wide range of water levels, to accommodate changes in water level due to evaporation. A slight adjustment of the position of the outer member 14 can perfect the positioning of the feeding ring portion 222. In addition it is easy for the aquarist to move the position of the feeding ring portion 222 from outside the aquarium using the magnetic coupling between the outer member 14 and the inner member 212.

In each of the above-described embodiments, the buoyant inner member 12, 12', 112, 212 shown in FIGS. 1-5 and/or the outer member 14 could be made from molded plastic parts and the product would still function essentially the same way, as long as the plastic used was buoyant, or air was retained inside the inner member 12, 12', 112, 212 to provide buoyancy. Alternatively, the inner member may include a motor, pump, filter element, or other aquarium tool or device that may or may not be buoyant but which includes a magnetic or magnetically attractable element attached thereon for magnetic coupling with the outer member 14 so as to be removably secured to the inner surface of the aquarium wall. The width of the jaws or arms on the inner member 12, 12', 112 can be modified so that one two or more sets of magnets could be used for different scale models.

One of ordinary skill will recognize that all or portions of the inner and outer members could be cut to any shape and have numerous holes to accommodate one or more magnetic or magnetically attractable elements, allowing the product to be developed in larger sizes and different configurations.

While various embodiments of the present invention have been described above, it should be understood that they have been presented by way of example only, and not limitation. Thus, the breadth and scope of the invention should not be limited by the above-described embodiment, but should instead be defined only in accordance with the following claims and their equivalents.

The invention claimed is:

1. A magnetically coupled attachment device for an aquarium wall, comprising:
   an inner member including
      a main body portion; and
      an inner magnetic or magnetically attractable element coupled to or disposed within the main body portion;
   an outer member including an outer magnetic or magnetically attractable element and a polymer static cling layer, wherein the outer magnetic or magnetically attractable element is magnetically attracted to the inner magnetic or magnetically attractable element, and wherein the polymer static cling layer is adapted to removably attach the outer member to an outer surface of the aquarium wall, and whereby the inner member is removably attached to an inner surface of the aquarium wall by the outer member.

2. The magnetically coupled attachment device of claim 1, wherein the inner member is buoyant.

3. The magnetically coupled attachment device of claim 1, further comprising:
   a gripper element coupled to or defined by the main body portion of the inner member and having first and second arms biased toward one another to hold food for aquatic life.

4. The magnetically coupled attachment device of claim 3, wherein the gripper element comprises a molded clip coupled to the main body portion, and wherein the first and second arms are biased toward one another by a mechanical spring.

5. The magnetically coupled attachment device of claim 3, wherein the first arm comprises a first flexible arm having a first magnetic or magnetically attractable element coupled proximate an end of the first arm, wherein the second arm comprises a second flexible arm having a second magnetic or magnetically attractable element coupled proximate an end of the second arm, and wherein the first and second magnetic or magnetically attractable elements are magnetically attracted to one another to hold food for aquatic life between the ends of the first and second arms.

6. The magnetically coupled attachment device of claim 5, wherein the main body portion of the inner member defines the first and second arms and is configured to fold in an area between the first and second arms to define a hinged clamp.

7. The magnetically coupled attachment device of claim 6, wherein one of the first and second magnetic or magnetically attractable elements is the inner magnetic or magnetically attractable element.

8. The magnetically coupled attachment device of claim 5, wherein a second end of each of the first and second arms is connected to the main body.

9. The magnetically coupled attachment device of claim 5, wherein a hook layer of a hook-and-loop fastener is adhesively coupled proximate the end of at least one of the first and second arms adjacent to the first or second magnetic or magnetically attractable element.

10. The magnetically coupled attachment device of claim 5, wherein the first magnetic or magnetically attractable element is disposed within a through hole defined at the end of the first arm of the inner member, and wherein the second magnetic or magnetically attractable element is disposed within a through hole defined at the end of the second arm of the inner member.

11. The magnetically coupled attachment device of claim 3, wherein the first and second arms of the inner member are formed from a buoyant closed-cell foam material.

12. The magnetically coupled attachment device of claim 11, wherein the buoyant closed-cell foam material comprises die-cut cross-linked polyethylene foam, an ethylene vinyl acetate (EVA) polymer, or polychloroprene.

13. The magnetically coupled attachment device of claim 1, wherein the polymer static cling layer comprises static cling vinyl attached to the outer member and configured to removably adhere the outer member to the outer surface of the aquarium wall.

14. The magnetically coupled attachment device of claim 1, wherein the polymer static cling layer comprises polyurethane dome material attached to the outer member and configured to removably adhere the outer member to the outer surface of the aquarium wall.

15. The magnetically coupled attachment device of claim 1, wherein the outer magnetic or magnetically attractable element is disposed within a through hole defined in a main body of the outer member, and wherein the polymer static cling layer is disposed on a surface of the main body and an additional layer is disposed on an opposite surface of the main body, the polymer static cling layer and the additional layer sealing the outer magnetic or magnetically attractable element within the through hole.

16. The magnetically coupled attachment device of claim 1, wherein the main body portion of the inner member is formed from a buoyant closed-cell foam material.

17. The magnetically coupled attachment device of claim 16, wherein the buoyant closed-cell foam material comprises die-cut cross-linked polyethylene foam, an ethylene vinyl acetate (EVA) polymer, or polychloroprene.

18. The magnetically coupled attachment device of claim 1, wherein a main body of the outer member is formed from a buoyant closed-cell foam material.

19. The magnetically coupled attachment device of claim 18, wherein the buoyant closed-cell foam material comprises die-cut cross-linked polyethylene foam, an ethylene vinyl acetate (EVA) polymer, or polychloroprene.

20. The magnetically coupled attachment device of claim 1, wherein at least one of the inner and outer magnetic or magnetically attractable elements comprises a neodymium magnet.

21. The magnetically coupled attachment device of claim 1, wherein the inner member further comprises a buoyant ring configured to receive food for aquatic life, wherein the buoyant ring is coupled to the main body portion by a flexible arm.

22. The magnetically coupled attachment device of claim 21, wherein the buoyant ring and the flexible arm comprise a buoyant closed-cell foam material.

23. The magnetically coupled attachment device of claim 22, wherein the buoyant closed-cell foam material comprises die-cut cross-linked polyethylene foam, an ethylene vinyl acetate (EVA) polymer, or polychloroprene.

24. A magnetically coupled feeding device for an aquarium, comprising:
  a buoyant inner member including
    a main body portion;
    an inner magnetic or magnetically attractable element coupled to or disposed within the main body portion; and
    a food retention element coupled to or defined by the main body portion;
  an outer member including an outer magnetic or magnetically attractable element wherein the outer member includes a polymer static cling layer adapted to removably attach the outer member to an outer surface of the aquarium wall, wherein the outer magnetic or magnetically attractable element is magnetically attracted to the inner magnetic or magnetically attractable element, whereby the buoyant inner member is removably attached to an inner surface of a wall of the aquarium by the outer member.

25. The feeding device of claim 24, wherein the food retention element comprises a hinged clamp having first and second arms biased toward one another to hold food for aquatic life.

26. The feeding device of claim 24, wherein the food retention element comprises a floating feeding ring.

* * * * *